United States Patent
Martin

(10) Patent No.: US 9,464,723 B2
(45) Date of Patent: Oct. 11, 2016

(54) TIMING VALVE AND KICK-DOWN VALVE

(71) Applicant: AUSCO, INC., Farmingdale, NY (US)

(72) Inventor: Francis J. Martin, Huntington, NY (US)

(73) Assignee: AUSCO, INC., Farmingdale, NY (US)

( * ) Notice: Subject to any disclaimer, the term of this patent is extended or adjusted under 35 U.S.C. 154(b) by 127 days.

(21) Appl. No.: 14/466,638

(22) Filed: Aug. 22, 2014

(65) Prior Publication Data

US 2016/0053903 A1 Feb. 25, 2016

(51) Int. Cl.
*F16K 15/02* (2006.01)
*F16K 11/10* (2006.01)
*F16K 17/30* (2006.01)
*F16K 21/12* (2006.01)
*F16K 1/36* (2006.01)
*F16K 31/122* (2006.01)
*F16K 39/02* (2006.01)

(52) U.S. Cl.
CPC ............... *F16K 15/025* (2013.01); *F16K 1/36* (2013.01); *F16K 11/105* (2013.01); *F16K 17/30* (2013.01); *F16K 21/12* (2013.01); *F16K 31/122* (2013.01); *F16K 39/024* (2013.01)

(58) Field of Classification Search
CPC ............ F16K 1/36; F16K 3/26; F16K 3/265; F16K 15/025; F16K 31/122; F16K 31/1221; F16K 39/024
USPC .................................. 137/501, 512.3, 514.5
See application file for complete search history.

(56) References Cited

U.S. PATENT DOCUMENTS

| 2,662,477 A | * | 12/1953 | Logan | F02M 37/0023 137/512.3 |
| 3,752,182 A | * | 8/1973 | Brand | F15B 13/0417 137/504 |
| 5,288,025 A | * | 2/1994 | Cerny | F02M 51/061 239/533.11 |
| 7,156,120 B2 | * | 1/2007 | Cherfane | G05D 7/0133 137/504 |
| 8,276,611 B2 | * | 10/2012 | Swab | B29B 7/7404 137/497 |

FOREIGN PATENT DOCUMENTS

GB 2022778 A * 12/1979 ............. F16K 3/265

* cited by examiner

*Primary Examiner* — Kevin Murphy
*Assistant Examiner* — Richard K Durden
(74) *Attorney, Agent, or Firm* — F. Chau & Associates, LLC.

(57) ABSTRACT

A timing valve includes a moveable piston that has a solid end face at a first end that includes an orifice, an open second end, and side walls that define an enclosed space, a stepped region on an outer surface of the piston, complementary stepped region on an inner surface of a hollow body containing the piston, and an annulus that extends toward the second end defined by a space between the outer surface of the piston and the inner surface of the hollow body. Fluid flowing through the orifice pushes the piston into an open position that forms a space between the stepped and complementary stepped regions that fills with fluid seeping in through the annulus. When pressure on the piston falls below a threshold, the return of the piston to a closed position is slowed by expelling fluid from the space between the stepped and complementary stepped regions.

9 Claims, 6 Drawing Sheets

TIMING VALVE AND KICK-DOWN VALVE

BACKGROUND OF THE INVENTION

1. Technical Field

The present disclosure relates to a timing valve and a kick-down valve, both of which can relieve pressure at predetermined timing intervals.

2. Discussion of the Related Art

A timing valve is a type of valve used to control a flow of fluid through a system. When pressure in the system rises to a predetermined level, the timing valve will open to allow the pressurized fluid to flow from an auxiliary passage out of the system. By releasing the pressurized fluid when the predetermined pressure is reached or exceeded, fluid flow through the system may be controlled. Accordingly, timing valves may be used to ensure that an amount of fluid flowing through a system does not exceed design limits.

SUMMARY

According to an embodiment of the invention, there is provided a timing valve, including a hollow singular body with an inlet at a first end and first outlets penetrating a side wall thereof in a region near the inlet, a moveable hollow timing piston enclosed by said singular body that has a solid end face at a first end of the timing piston proximal to the inlet that includes an orifice, an open second end, and side walls that define a first enclosed space and cover the first outlets when in a closed position, and a timing spring enclosed by the timing piston and having a first end mounted on the timing piston. Fluid flowing into the singular body through the inlet flows through the orifice in the end face of the timing piston, where fluid pressure on the end face pushes the timing piston against the spring into an open position that exposes the first outlets. Fluid flows out through the first outlets, stabilizing pressure on the timing piston and allowing the timing piston to remain in an open position.

According to another embodiment of the invention, there is provided a timing valve, including a moveable hollow timing piston enclosed by a hollow singular body that has a solid end face at a first end thereof that includes an orifice, an open second end, and side walls that define a first enclosed space, a stepped region on an outer surface of the timing piston, a complementary stepped region on an inner surface of the singular body, wherein a diameter of the timing piston and the inner surface of the singular body widens in a region that extends toward the open second end of the timing piston, and a timing annulus that extends toward the second end defined by a space between the outer surface of the timing piston and the inner surface of the hollow singular body. Fluid flowing through the orifice in the end face of the timing piston pushes the timing piston against the timing spring into an open position and forms a space between the stepped region of the timing piston and the complementary stepped region of the singular body that fills with fluid seeping in through the timing annulus. When pressure on the timing piston falls below a first threshold, the timing piston returns to a closed position, where the return of the timing piston to a closed position is slowed by the expelling of fluid from the space between the stepped region of the timing piston and the complementary stepped region of the singular body.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
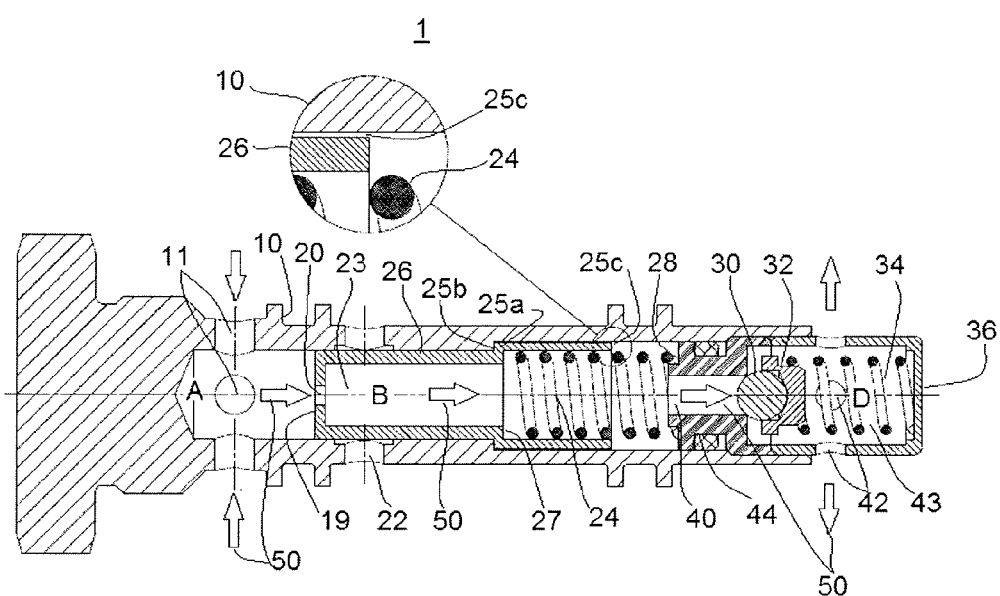
FIG. 1 is a schematic diagram of a timing valve in a closed position according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. In the drawings, the sizes of some components may be exaggerated for clarity, and like numbers may refer to like elements throughout.

FIG. 1 is a schematic diagram of a timing valve 1 in a closed position according to exemplary embodiments of the present invention.

Referring now to FIG. 1, the timing valve 1 according to an embodiment of the invention may have a hollow singular body 10 with an inlet opening 11 at a first end of the singular body 10. A timing piston 26 may be inserted into the singular body 10 from a second end of the singular body 10 that is opposite to the first end, and a first end of the timing piston may be disposed inward from the inlet opening 11 of the singular body 10. The first end of the timing piston 26 is closed by an end face 19 with an open orifice 20 in the center. The diameter of the opening of the orifice 20 is small as compared to the diameter of the end face 19. In some embodiments, such as the embodiment illustrated in FIG. 6, the exterior walls of the timing piston 26 may extend past the end face 19 to form a partially enclosed cavity 18. The extended walls may be configured to accommodate a filter. The orifice 20 opens into a first enclosed space 23 inside the timing piston. The singular body has first outlets 22 disposed in a side wall thereof in the region adjacent to the timing piston near the end face 19 of the timing piston 26.

In addition, the timing piston 26 has a stepped portion 25*a* where the diameter of the outer wall of the timing piston 26 and of the first enclosed space 23 widens, and the timing piston 26 fits into a complementary stepped portion 25*b* of the inner wall of the singular body 10. A shoulder 27 is defined by the inner wall of the timing piston 26 by the increased width of the timing piston 26 upon which a first end of a timing spring 24 is mounted. A timing annulus 25*c* is define by a space between the outer wall of the timing piston 26 and the inner wall of the singular body 10 that extends from the stepped region 25*a* to the open second end of the timing piston 26 such that fluid may seep into the timing annulus 25c. The timing piston 26 also includes a seal 45 disposed in a groove in the outer wall of the timing piston 26 between the stepped portion 25a and the end face 19 to prevent leakage.

The second end of the timing spring 24 is mounted on a seat 28 inserted into the singular body 10 from the second end of the singular body 10 and spaced apart from the timing piston 26. The seat 28 surrounds a flow passage 40 through a relief valve 30 that connects the first enclosed space 23 of the timing piston 26 to a second enclosed space 43 connected to a plurality of second outlets 42. In one embodiment, the relief valve 30 is a ball valve mounted in a retainer 32, and the retainer 32 and ball valve 30 are pressed against the flow passage by an axial force exerted by a relief spring 34 mounted on a side of the retainer 32 opposite the relief valve 30. The other end of the spring is mounted on a retainer housing 36. The retainer housing may be inserted into the singular body from the second end of the singular body, and may include the second outlets 42.

Figure 3:
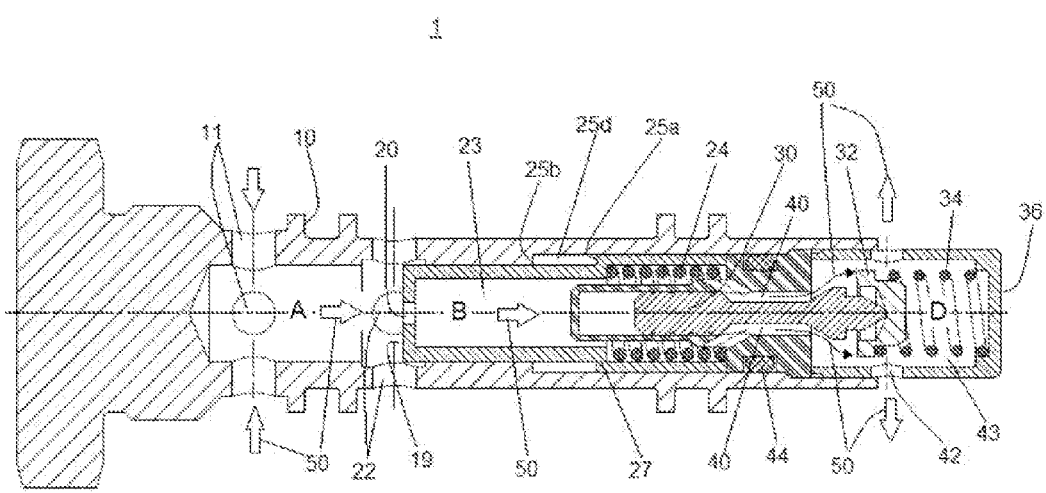
FIG. 3 is a schematic diagram of a timing valve in an open position according to another exemplary embodiment of the present invention.

In other embodiments of the invention the relief valve 30 may be a poppet valve that is enclosed by the seat 28, as shown in FIG. 3. A poppet valve according to this embodiment of the invention may be part of a pressure relief valve such as that described in the inventor's copending application, U.S. application Ser. No. 14/063,760, filed on Oct. 25, 2013 in the U.S. Patent and Trademark Office, the contents of which are herein incorporated by reference in their entirety. The relief spring 34 may be located within the singular body 10 to provide an axial closing force against a second end of the poppet 30. The relief spring 34 may push against the retainer 32 that may also be inserted into the second end of the singular body 10. A ring-like seal 44 may be disposed between the seat 28 and the inner wall of the singular body 10 to prevent fluid seepage from the first enclosed space 23 to the second enclosed space 43.

As shown by flow arrows 50, fluid may flow through the timing valve 1, entering at the inlet 11, though the orifice 20 of the timing piston 24 into the first enclosed space 23, through the flow passage 40 through the seat 28 of the relief value to the second enclosed space 43, exiting through the second outlets 42.

Fluid may press against the relief valve 30, and when the fluid pressure exceeds a first threshold pressure, the force of the relief spring 34 is overcome and the relief valve 30 moves away from the seat 28 thus allowing the fluid to escape into the second enclosed space 43 and out through the second outlets 42 and the hollow second end of the poppet 23. The release of fluid may reduce the fluid pressure so that the force of the retainer spring 34 pushes the relief valve 30 against the seat 28 thereby closing off fluid flow through the second outlets 42.

However, as fluid flows through the orifice 20 of the timing piston 24, fluid pressure builds on the end face 19 that surrounds the orifice 20, pushing the timing piston 26 against the timing spring 24 toward the second end of the timing valve 1. As the timing piston 26 is pushed into the timing spring 24, a pocket 25d is formed between the stepped portion 25a of the timing piston 26 and the stepped portion 25b of the inner wall of the singular body 10. Fluid may seep into the pocket 25d through the timing annulus 25c between the outer wall of the timing piston 26 and the inner wall of the singular body 10.

Figure 2:
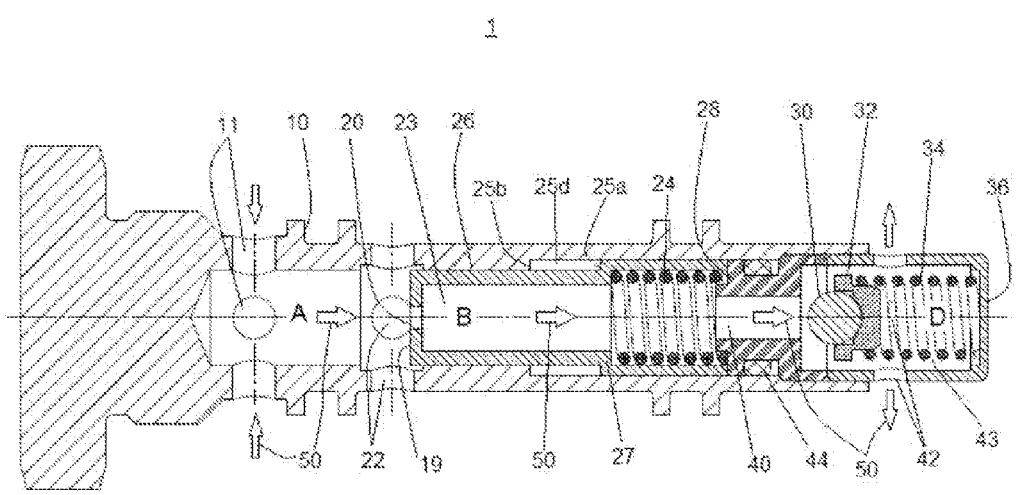
FIG. 2 is a schematic diagram of a timing valve in an open position according to an exemplary embodiment of the present invention.

When the timing valve is in a closed position, as shown in FIG. 1, the wall of the timing valve prevents fluid from flowing out from the first enclosed space 23 through the first outlets 22. Thus, as disclosed above, as fluid pressure pushes the timing piston 26 into the timing spring 24, the timing piston 26 is pushed past the first outlets 22 into an open position, illustrated in FIG. 2, forming a opening from the first enclosed space 23, allowing fluid to flow out through the first outlets 22 rather than through the flow passage 40 to the second outlets 42. This diversion of fluid flow prevents a further buildup of pressure on the end plate 19 of the timing piston 26, stabilizing the position of the timing piston 26. If the fluid pressure on the end plate 19 drops, the timing piston 26 shifts back toward the inlet 11 due to the axial closing force of the timing spring 24 to close the first outlets 22. The fluid trapped in the pocket 25d is expelled through the timing annulus 25c between the outer wall of the timing piston 26 and the inner wall of the singular body 10. However, the backward movement of the timing piston is slowed by the fluid being expelled from the pocket 23d through the timing annulus 25c and is stopped by the stepped portions 25a and 25b of the timing valve and the inner wall of the singular body 10, respectively.

In particular, the fluid flowing through the timing valve 1 will open the relief valve 30 when a pressure differential between regions A and D in the timing valve 1 due to the fluid flow becomes greater than the first threshold, and the timing piston begins to move if the fluid flow pressure differential between regions A and D is greater than a second threshold that is greater than the first threshold. Exemplary, non-limiting values for the first and second thresholds are 700 psid and 800 psid, respectively, and a time to open would be about 1 second. In addition, the poppet will close if the fluid flow pressure differential between regions A and D falls below a third threshold that is less than the first threshold. The timing piston 26 will close if the fluid flow pressure differential between regions A and D falls below the third threshold. An exemplary, non-limiting value for the third threshold is 650 psid, and the closing time for the timing piston 26 would be about 30 to 60 seconds. The timing of the closure of the timing piston 26 may be determined by the stiffness of the timing spring 24, and the clearance between the outer wall of the timing valve and the inner wall of the singular body 10 that defines the timing annulus 25c, which limits how quickly fluid is forced out of the pocket 25d between the respective stepped portions 25a of the timing piston 26 and the inner wall of the singular body 10. The time taken to expel fluid from the pocket 25d may also cushion the closing impact of the timing piston 26 against the stepped portion 25b of the inner wall of the singular body 10. Thus, the delay in the closing of the timing piston 26 may allow certain operations dependent upon the fluid flow to complete before the timing valve 26 shuts off the fluid flow. Once the timing piston has closed, it may again be pushed into an open position by the pressure exerted by flowing fluids on the end face 19.

Figure 4:
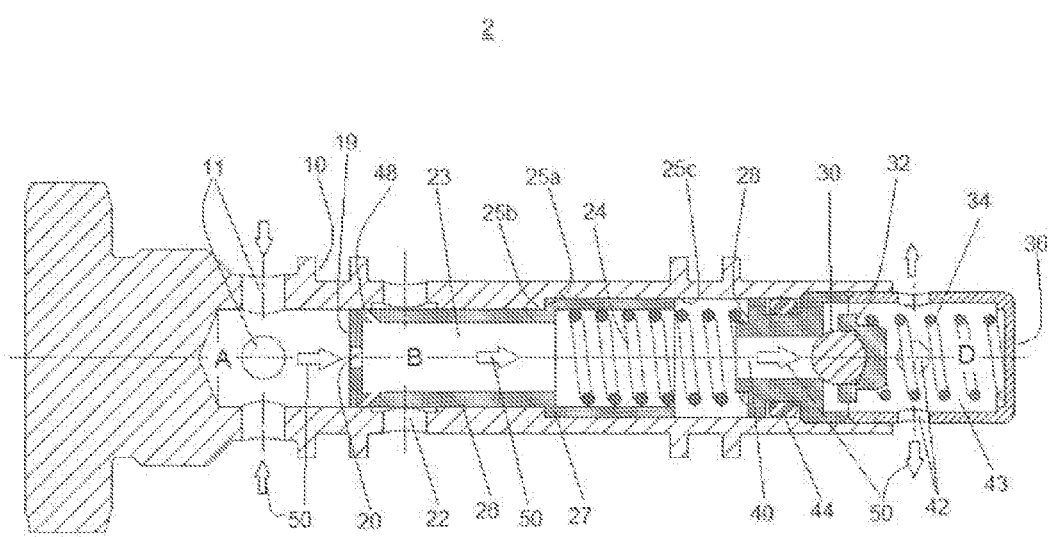
FIG. 4 is a schematic diagram of a kick-down valve in a closed position according to an exemplary embodiment of the present invention.
Figure 5:
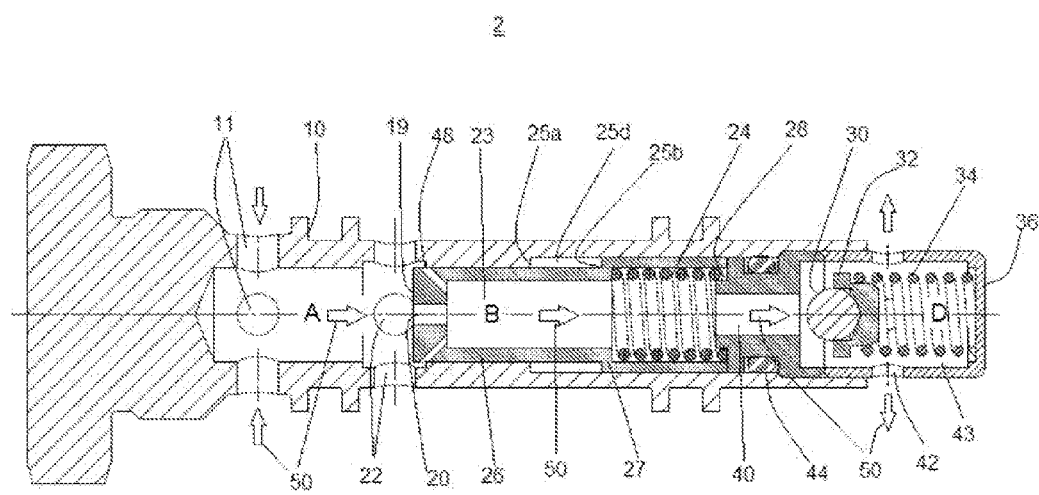
FIG. 5 is a schematic diagram of a kick-down valve in an open position according to another exemplary embodiment of the present invention.
Figure 6:
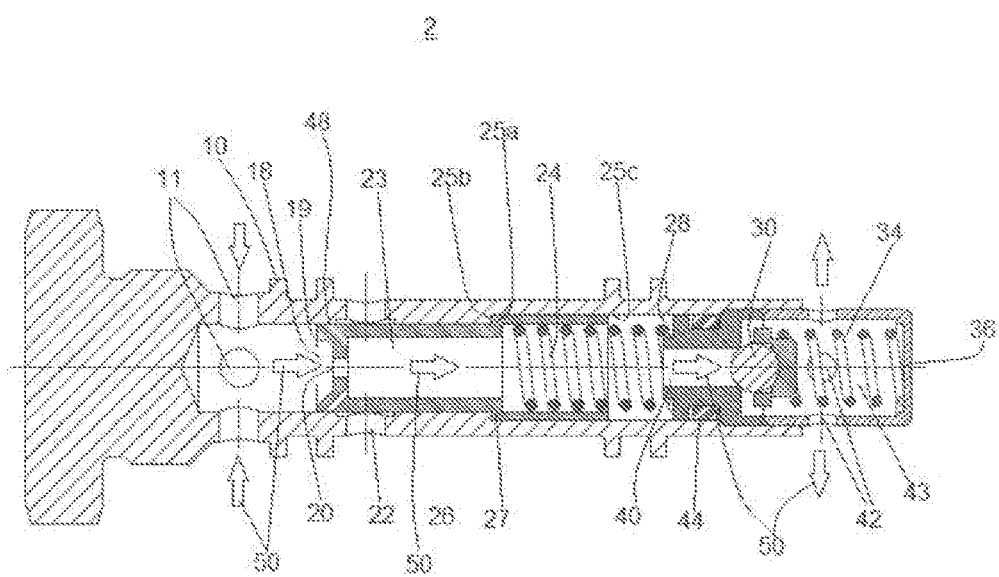
FIG. 6 is a schematic diagram of a kick-down valve in a closed position according to an exemplary embodiment of the present invention.

A timing valve according to another embodiment of the invention is shown in FIGS. 4-6. The timing valve 2 shown in FIGS. 4-6 may be referred to as a kick-down valve. The kick-down valve of FIGS. 4-6 differs from the timing valve of FIG. 1 by the inclusion of passages 48 in the wall of the timing piston 26. FIG. 4 depicts a kick-down valve of an embodiment of the invention in a closed position, FIG. 5 depicts a kick-down valve of another embodiment of the invention in an open position, and FIG. 6 depicts a kick-down valve of another embodiment of the invention in a closed position. The other elements of the kick-down valve 2 of FIGS. 4-6 are similar to the elements of the timing valve of FIG. 1, and thus a repeated description will be omitted.

Referring now to FIGS. 4 and 5, the timing piston 26 includes kick-down passages 48 through the piston wall that are disposed proximal to the end plate 19 of the first end of the timing piston 26. In the embodiment shown in FIG. 4, the kick-down passages 28 are disposed in the side wall of the timing piston 26, while in the embodiments of FIGS. 5 and 6, the kick-down passages 28 extend from the inside of the end face through the end walls or extended outer walls before exiting. In these embodiments, the passage exits are between the end face 19 and the terminus of the extended outer walls of the timing piston 26.

In operation, as the timing piston 26 is opened by the force of fluid flowing therethrough, the outlets of the passages 48 will come into contact with the first outlets 22 before the end face 19 of the timing piston is pushed past the first outlets 22, which ports the end face 19 of the timing piston toward the low pressure region B in the first enclosed space 23. This opens a passage from region A to region B for flow, causing a diversion of fluid pressure from the first enclosed space 23 outward through the passages 28, which will quickly push the timing piston into an open position and will keep the timing piston open until the pressure of region A—the pressure of region B decreases to less than a fourth threshold.

In particular, the relief valve 30 will open when the pressure differential between regions A and D in the figure exceeds the first threshold. An exemplary, non-limiting value for the first threshold is 700 psid. At that pressure, the timing piston will open in approximately 25 ms as pressure at region B is ported to the back of the timing piston at region A. As long as the pressure of region A minus the pressure of region B is greater than a fourth threshold, or if the pressure of region B minus the pressure of region D is greater than the second threshold, the timing piston will stay open. When the pressure between regions A and B falls below the fourth threshold, and the pressure between regions B and D falls below the third threshold, the timing piston will close with a predetermined delay. Exemplary, non-limiting values for the second, third, and fourth thresholds are, respectively, 800 psid, 650 psid, and 50 psid, and at these pressures, the predetermined delay may be about 30-60 seconds.

The above specific exemplary embodiments are illustrative, and many variations and combinations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A timing valve, comprising:
   a moveable hollow timing piston enclosed by a hollow singular body that has a solid end face at a first end thereof that includes an orifice, an open second end, and side walls that define a first enclosed space;
   a stepped region on an outer surface of the timing piston;
   a complementary stepped region on an inner surface of the singular body, wherein a diameter of the timing piston and the inner surface of the singular body widens in a region that extends toward the open second end of the timing piston; and
   a timing annulus that extends toward the second end defined by a space between the outer surface of the timing piston and the inner surface of the hollow singular body; and
   wherein fluid flowing through the orifice in the end face of the timing piston pushes the timing piston against the timing spring into an open position and forms a space between the stepped region of the timing piston and the complementary stepped region of the singular body that fills with fluid seeping in through the timing annulus,
   wherein when pressure on the timing piston falls below a first threshold, the timing piston returns to a closed position, wherein the return of the timing piston to a closed position is slowed by the expelling of fluid from the space between the stepped region of the timing piston and the complementary stepped region of the singular body.

2. The timing valve of claim 1, further comprising a timing spring enclosed by the timing piston and having a first end mounted on the timing piston, wherein the timing piston is pushed against the timing spring into the open position.

3. The timing valve of claim 2, wherein the first end of the timing spring is mounted on a shoulder of the timing piston defined by an inner surface of the stepped region.

4. The timing valve of claim 2 further comprising a hollow singular body with an inlet at a first end and first outlets penetrating a side wall thereof in a region near the inlet, wherein said timing piston is inserted through the inlet, and side walls of the timing piston cover the first outlets when in a closed position.

5. The timing valve of claim 4, wherein the stepped region limits movement of the timing piston toward the inlet of the singular body.

6. The timing valve of claim 4, wherein when the piston is in an open position, the first outlets are exposed, wherein fluid flows out through the first outlets, stabilizing pressure on the timing piston and allowing the timing piston to remain in an open position.

7. The timing valve of claim 4, wherein the singular body further comprises a seat enclosed by the singular body disposed within the singular body at a position spaced apart from the timing piston, and upon which a second end of the timing spring is mounted, wherein the seat further encloses a flow passage that permits fluid to flow from the first enclosed space out of the singular body.

8. The timing valve of claim 7, further comprising a relief valve disposed in the seat at an end of the flow passage away from the timing piston, the relief valve being held by a retainer connected to a relief spring and being configured to be opened by flow pressure from fluid flowing in from the flow passage; and
   a retainer housing inserted into a second end of the singular body that is opposite of the first end, wherein the retainer housing contains the relief spring, encloses a second enclosed space and includes second outlets through which fluid flowing in through the flow passage exits the timing valve.

9. The timing valve of claim 8, further comprising a plurality of slanted passages that extend through the side walls of the timing piston from the first enclosed space to exit from the outer side wall proximal to the end face of the timing piston, wherein said slanted passages slant in a direction that is directed away from the open second end of the timing piston,
   wherein as the timing piston is pushed out of a closed position, the passages connect the space enclosed by the timing piston to the first outlets in the side wall of the singular body before the end face is pushed past the first outlets increasing a pressure differential between the enclosed space and the end face of the timing piston,
   wherein the timing position is maintained in an open position if a pressure on the end face minus the pressure in the enclosed space is greater than a second threshold, or if the pressure of the first enclosed space minus a pressure of the second enclosed space is greater than a third threshold.

* * * * *